United States Patent
Hamilton, II et al.

(10) Patent No.: US 10,416,995 B2
(45) Date of Patent: *Sep. 17, 2019

(54) TECHNIQUES FOR PROVIDING ENVIRONMENTAL IMPACT INFORMATION ASSOCIATED WITH CODE

(71) Applicant: INTERNATIONAL BUSINESS MACHINES CORPORATION, Armonk, NY (US)

(72) Inventors: Rick Allen Hamilton, II, Charlottesville, VA (US); James R. Kozloski, New Fairfield, CT (US); Brian Marshall O'Connell, Cary, NC (US); Clifford Alan Pickover, Yorktown Heights, NY (US); Keith Raymond Walker, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 224 days.

This patent is subject to a terminal disclaimer.

(21) Appl. No.: 15/088,578

(22) Filed: Apr. 1, 2016

(65) Prior Publication Data
US 2016/0246595 A1 Aug. 25, 2016

Related U.S. Application Data

(63) Continuation of application No. 14/278,790, filed on May 15, 2014, now Pat. No. 9,335,975, which is a
(Continued)

(51) Int. Cl.
*G06F 9/44* (2018.01)
*G06F 9/445* (2018.01)
(Continued)

(52) U.S. Cl.
CPC ............. *G06F 8/73* (2013.01); *G06F 8/30* (2013.01); *G06F 8/77* (2013.01); *G06F 11/302* (2013.01);
(Continued)

(58) Field of Classification Search
CPC ............. G06F 8/73–78; G06F 8/30; G06F 11/302–3062; G06F 8/77; G06F 11/3062; G06F 11/3058
See application file for complete search history.

(56) References Cited

U.S. PATENT DOCUMENTS 5,265,254 A * 11/1993 Blasciak ............. G06F 11/3466
713/502
6,205,555 B1 3/2001 Kageshima et al.
(Continued)

OTHER PUBLICATIONS

Jurgen Schnerr, High-Performance Timing Simulation of Embedded Software, 2008, pp. 290-295. https://ieeexplore.ieee.org/stamp/stamp.jsp?tp=&arnumber=4555825 (Year: 2008).*
(Continued)

*Primary Examiner* — Mongbao Nguyen
(74) *Attorney, Agent, or Firm* — Issac Gooshaw; Matthew M. Hulihan; Heslin Rothenberg Farley & Mesiti PC

(57) ABSTRACT

A technique for providing environmental impact information associated with code includes determining, based on execution of the code on a computer system, an environmental impact of a code execution sequence included in the code. A section of the code that is associated with the code execution sequence is then annotated with environmental impact information associated with the environmental impact of the code execution sequence.

19 Claims, 3 Drawing Sheets

Related U.S. Application Data continuation of application No. 12/474,334, filed on May 29, 2009, now Pat. No. 8,756,564.

(51) Int. Cl.
  *G06F 9/45* (2006.01)
  *G06F 8/73* (2018.01)
  *G06F 8/77* (2018.01)
  *G06F 11/30* (2006.01)
  *G06F 8/30* (2018.01)

(52) U.S. Cl.
  CPC ...... *G06F 11/3062* (2013.01); *G06F 11/3058* (2013.01)

(56) References Cited

U.S. PATENT DOCUMENTS

| | | | |
|---|---|---|---|
| 6,477,438 B1 | 11/2002 | Sakai et al. | |
| 6,557,167 B1 | 4/2003 | Thelen | |
| 6,598,221 B1 | 7/2003 | Pegatoquet et al. | |
| 6,874,140 B1* | 3/2005 | Shupak | G06F 11/3644 714/E11.209 |
| 6,986,069 B2 | 1/2006 | Oehler et al. | |
| 7,013,460 B2 | 3/2006 | Thompson et al. | |
| 7,036,118 B1* | 4/2006 | Ulery | G06F 8/4442 717/159 |
| 7,103,881 B2 | 9/2006 | Stone | |
| 7,152,185 B2* | 12/2006 | Srivastava | G06F 11/326 714/24 |
| 7,178,138 B2 | 2/2007 | Kuzemchak et al. | |
| 7,185,338 B2 | 2/2007 | Chamdani et al. | |
| 7,254,806 B1 | 8/2007 | Yates, Jr. et al. | |
| 7,278,136 B2 | 10/2007 | Moritz et al. | |
| 7,281,237 B2 | 10/2007 | De Jong | |
| 7,290,246 B2 | 10/2007 | Cyran et al. | |
| 7,398,518 B2 | 7/2008 | Dichter | |
| 7,458,065 B2 | 11/2008 | Sanchez et al. | |
| 7,496,908 B2 | 2/2009 | Dewitt, Jr. et al. | |
| 7,509,632 B2* | 3/2009 | Boger | G06F 11/3612 717/127 |
| 7,530,047 B2 | 5/2009 | Wang et al. | |
| 7,720,662 B1* | 5/2010 | Aldrich | G06F 11/3692 345/589 |
| 7,735,073 B1* | 6/2010 | Kosche | G06F 11/3612 717/130 |
| 7,810,069 B2 | 10/2010 | Charisius et al. | |
| 7,818,342 B2* | 10/2010 | Stuhec | G06Q 10/10 707/777 |
| 7,827,543 B1 | 11/2010 | Kosche et al. | |
| 7,849,440 B1 | 12/2010 | Englehart | |
| 7,971,073 B2* | 6/2011 | Hsu | G06F 1/3203 713/1 |
| 7,996,255 B1* | 8/2011 | Shenoy | G06Q 30/02 705/7.29 |
| 8,001,510 B1* | 8/2011 | Miller | G06F 17/5045 716/102 |
| 8,060,869 B1* | 11/2011 | Panchenko | G06F 8/44 711/3 |
| 8,065,665 B1* | 11/2011 | Kosche | G06F 8/443 717/127 |
| 8,095,650 B1* | 1/2012 | Cheng | G06F 11/32 709/203 |
| 8,127,121 B2 | 2/2012 | Yates, Jr. et al. | |
| 8,387,006 B1 | 2/2013 | Taylor | |
| 8,527,964 B2 | 9/2013 | Moriat et al. | |
| 8,578,347 B1* | 11/2013 | Carrick | G06F 11/3409 717/104 |
| 8,762,951 B1 | 6/2014 | Kosche et al. | |
| 8,769,491 B1* | 7/2014 | Conti | G06F 8/314 709/201 |
| 9,274,811 B1* | 3/2016 | Reeves | G06F 8/61 |
| 2002/0112225 A1 | 8/2002 | Charisius et al. | |
| 2002/0124239 A1 | 9/2002 | Nelson | |
| 2003/0056199 A1 | 3/2003 | Li et al. | |
| 2003/0093780 A1* | 5/2003 | Freudenberger | G06F 8/443 717/153 |
| 2003/0140334 A1 | 7/2003 | Granston et al. | |
| 2003/0171907 A1* | 9/2003 | Gal-On | G06F 17/5022 703/14 |
| 2004/0054992 A1* | 3/2004 | Nair | G06F 8/443 717/138 |
| 2004/0111701 A1 | 6/2004 | Beust | |
| 2004/0268159 A1 | 12/2004 | Aasheim et al. | |
| 2005/0021689 A1 | 1/2005 | Marvin et al. | |
| 2005/0071813 A1 | 3/2005 | Reimer et al. | |
| 2005/0071834 A1 | 3/2005 | Gates et al. | |
| 2005/0262307 A1* | 11/2005 | Chiang | G06F 8/70 711/137 |
| 2006/0168480 A1 | 7/2006 | Chandler et al. | |
| 2006/0218543 A1* | 9/2006 | Boger | G06F 11/3612 717/157 |
| 2006/0265640 A1* | 11/2006 | Albornoz | G06F 17/2247 715/234 |
| 2006/0294502 A1* | 12/2006 | Das | G06F 8/73 717/129 |
| 2007/0180455 A1 | 8/2007 | Mariani | |
| 2007/0198864 A1 | 8/2007 | Takase | |
| 2007/0220292 A1 | 9/2007 | Ishihara et al. | |
| 2007/0220342 A1* | 9/2007 | Vieira | G06F 11/3688 714/33 |
| 2007/0226681 A1 | 9/2007 | Thorup | |
| 2007/0277149 A1 | 11/2007 | Stevens et al. | |
| 2007/0294673 A1* | 12/2007 | Guerrera | G06F 11/3419 717/130 |
| 2008/0127120 A1* | 5/2008 | Kosche | G06F 11/3447 717/131 |
| 2008/0155284 A1 | 6/2008 | Shimohata et al. | |
| 2008/0174410 A1* | 7/2008 | Sarangapani | G06K 7/0008 340/10.4 |
| 2008/0229028 A1* | 9/2008 | Cascaval | G06F 8/4442 711/141 |
| 2008/0263520 A1 | 10/2008 | Aguilar et al. | |
| 2008/0307383 A1* | 12/2008 | Charlebois | G06F 17/505 716/104 |
| 2009/0037884 A1 | 2/2009 | Benameur et al. | |
| 2009/0293041 A1 | 11/2009 | Wollnik et al. | |
| 2010/0042976 A1* | 2/2010 | Hines | G06F 8/72 717/127 |
| 2010/0153915 A1 | 6/2010 | Schneider | |
| 2011/0154439 A1* | 6/2011 | Patel | G06F 21/554 726/3 |
| 2013/0179860 A1 | 7/2013 | Woock | |
| 2013/0275950 A1 | 10/2013 | Dalcher | |

OTHER PUBLICATIONS

Qingsong Shi, Dynamic Compilation Framework with DVS for Reducing Energy Consumption in Embedded Processors, 2008, pp. 464-470. https://ieeexplore.ieee.org/stamp/stamp.jsp?arnumber=4595598 (Year: 2008).*

Trevor Meyerowitz, Source-Level Timing Annotation and Simulation for a Heterogeneous Multiprocessor, 2008, pp. 1-4. https://ieeexplore.ieee.org/stamp/stamp.jsp?tp=&arnumber=4484897 (Year: 2008).*

Erik Yu-Shing Hu, A Static Timing Analysis Environment Using Java Architecture for Safety Critical Real-Time Systems, 2002, pp. 1-8. https://ieeexplore.ieee.org/stamp/stamp.jsp?tp=&arnumber=1000039 (Year: 2002).*

Christoph M. Kirchsteiger, A Software Performance Simulation Methodology for Rapid System Architecture Exploration, 2008, pp. 494-497. https://ieeexplore.ieee.org/stamp/stamp.jsp?tp=&arnumber=4674898 (Year: 2008).*

Markus Mock, Calpa: A Tool for Automating Selective Dynamic Compilation, 2000, p. 291-301. https://ieeexplore.ieee.org/stamp/stamp.jsp?tp=&arnumber=898079 (Year: 2000).*

Cornea et al., Software Annotations for Power Optimization on Mobile Devices, Design, Automation and Test in Europe, 2006, Date apros; 06, proceeding, vol. 1, Issue, Mar. 6-10, 2006, pp. 1-6, IEEE.

(56) References Cited

OTHER PUBLICATIONS

Azevedo et al., An Annotation-Aware Java Virtual Machine Implementation, Concurrency: Practice and Experience, vol. 12, Issue 6, pp. 423-444 (2000).

Anvik et al., Task Articulation in Software Maintenance: Integrating Source Code Annotations with an Issue Tracking System, ICSM 2008, IEEE, 2008, pp. 460-461.

Azevedo et al., Java Annotation-Aware Just-In-Time (AJIT) Compilation System, In Proceedings of the ACM 1999 Conference on Java Grande, http://www.cs.ucsb.edu/conferences/java99/papers/63-azevedo.ps, pp. 1-10.

Office Action in U.S. Appl. No. 12/474,334, dated Jun. 4, 2012, pp. 1-35.

Partha Biswas, Performance and Energy Benefits of Instruction Set Extensions in an FPGA Soft Core, 2003, pp. 1-6.

Jurgen Schnerr, High-Performance Timing Simulation of Embedded Software, 2008, pp. 290-295.

G. Beltrame, Dynamic Modeling of Inter-Instruction Effects for Execution Time Estimation, 2001, pp. 1-5.

Final Office Action in U.S. Appl. No. 12/474,334, dated Nov. 1, 2012, pp. 1-28.

Office Action in U.S. Appl. No. 12/474,334, dated Sep. 13, 2013, pp. 1-30.

Notice of Allowance in U.S. Appl. No. 12/474,334, dated Feb. 5, 2014, pp. 1-38.

Office Action in U.S. Appl. No. 14/278,790, dated Mar. 25, 2015, pp. 1-45.

Final Office Action in U.S. Appl. No. 14/278,790, dated Sep. 10, 2015, pp. 1-42.

Nicolas Fournel et al., "Embedded software energy characterization: Using non-intrusive measures for application source code annotation", HAL, submitted Jun. 3, 2009, 16 pages, https://hal.archives-ouvertes.fr/hal-00391186.

Aimen Bouchhima et al., "Automatic Instrumentation Technique of Embedded Software for High Level Hardware/Software Co-Simulation", System Level Synthesis Group, TIMA Laboratory, 6 pages.

Raimund Kirner et al., "Classification of Code Annotations and Discussion of Compiler-Support for Worst-Case Execution Time Analysis", Proceedings of the 5th Intl Workshop on Worst-Case Execution Time (WCET) Analysis, ECRTS 2005, pp. 41-45, http://drops.dagstuhl.de/opus/volltexte/2007/815.

Notice of Allowance in U.S. Appl. No. 14/278,790, dated Feb. 18, 2016, pp. 1-20.

\* cited by examiner

TECHNIQUES FOR PROVIDING ENVIRONMENTAL IMPACT INFORMATION ASSOCIATED WITH CODE

CROSS-REFERENCE TO RELATED APPLICATION

This application is a continuation of U.S. Ser. No. 14/278,790, entitled "TECHNIQUES FOR PROVIDING ENVIRONMENTAL IMPACT INFORMATION ASSOCIATED WITH CODE", filed May 15, 2014, which is a continuation of U.S. Ser. No. 12/474,334 filed May 29, 2009 and issued as U.S. Pat. No. 8,756,564 on Jun. 17, 2014, both of which are hereby incorporated herein by reference in their entirety.

BACKGROUND

Field

This disclosure relates generally to environmental impact of code and, more specifically, to techniques for providing environmental impact information associated with code.

Related Art

Power management is a feature that has been implemented in various electrical devices (e.g., computer systems (computers) and computer peripherals such as monitors and printers) to turn-off power to a device or switch the device to a low-power state when the device is inactive. For example, power management for computers may be employed to prolong battery life for portable and embedded computers, reduce noise, and reduce operating costs. In general, when power consumption of a computer is reduced, the computer dissipates less heat which usually increases stability of the computer, saves money, and reduces environmental impact. Power management for microprocessors may address an entire processor or a specific processor area. For example, to decrease power consumption of a computer, dynamic voltage scaling may be employed (to modify a core voltage of one or more central processing units (CPUs)) and/or dynamic frequency scaling may be employed (to modify a clock rate of one or more CPUs). Some programs allow a user to manually adjust voltages/frequencies supplied to a CPU to reduce both the amount of heat produced and power consumed by the CPU. Other CPUs are configured to automatically under-volt/under-frequency a processor based on a current workload to reduce heat produced and power consumed by the CPUs.

A relatively well known power management standard for computers is the advanced configuration and power interface (ACPI), which is an open industry standard that allows an operating system (OS) to directly control associated hardware of a computer to reduce power consumption of the computer. ACPI is a successor to an earlier standard, known as advanced power management (APM), that allowed a basic input output system (BIOS) of a computer to control power management functions. The ACPI allows an OS to automatically turn-off components (e.g., monitors and hard disk drives (HDDs)) after, for example, set periods of inactivity. The ACPI also facilitates putting a computer in a hibernate state where most components (including a central processing unit (CPU) and random access memory (RAM)) are turned off. When a computer hibernates, the computer saves the contents of RAM to an HDD and powers down. On start-up, the computer reloads the saved content from the HDD.

Software is typically written in a high-level programming language (e.g., Fortran, C, C++), which is translated by a compiler into an executable or a set of shared objects that are stored together in libraries and loaded on demand by an executing program. These shared objects and executables comprise machine code (a set of instructions which a computer understands and executes). In general, compilers are designed to optimize the translation of high-level procedural code such that an associated machine code counterpart runs efficiently. Efficiency, in this regard, has usually referred to the speed at which a compiled program executes. Optimization may be limited, however, by the manner in which a programmer originally chose to compose associated high-level procedural code, since optimization searches for obvious code patterns that can be simplified to yield a more efficient execution. Due to the diversity of approaches that may be employed to achieve any given outcome using a high-level procedural programming language, optimization may be implemented through human reengineering of software code and/or at higher levels of competition among programmers, software engineers, and software design companies in an attempt to produce codes that achieve similar objectives more efficiently than codes of a competitor.

SUMMARY

According to one aspect of the present disclosure, a technique for providing environmental impact information associated with code includes determining, based on execution of the code on a computer system, an environmental impact of a code execution sequence included in the code. A section of the code that is associated with the code execution sequence is then annotated with environmental impact information associated with the environmental impact of the code execution sequence.

According to another aspect of the present disclosure, a technique for providing environmental impact information associated with code includes measuring power utilization for multiple computer systems, each having a different operating system or hardware platform, that is attributable to execution of a code execution sequence included in the code. The power utilization and correlation information is transmitted to an analysis and correlation module. The power utilization is then correlated with the code execution sequence based on the correlation information. A section of the code that is associated with the code execution sequence is then annotated with environmental impact information associated with the environmental impact of the code execution sequence for the multiple computer systems.

BRIEF DESCRIPTION OF THE DRAWINGS

The present invention is illustrated by way of example and is not intended to be limited by the accompanying figures, in which like references indicate similar elements. Elements in the figures are illustrated for simplicity and clarity and have not necessarily been drawn to scale.

DETAILED DESCRIPTION

Figure 1:
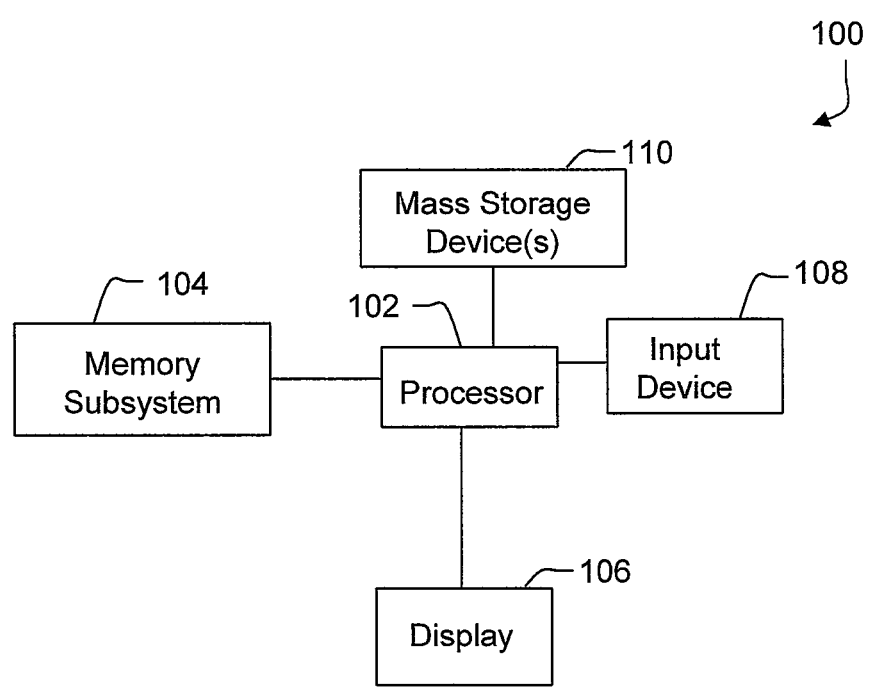
FIG. 1 is a diagram of an example computer system that may be employed to provide environmental impact information associated with code according to the present disclosure.

As will be appreciated by one of ordinary skill in the art, the present invention may be embodied as a method, system, or computer program product. Accordingly, the present invention may take the form of an entirely hardware embodiment, an entirely software embodiment (including firmware, resident software, microcode, etc.), or an embodiment combining software and hardware aspects that may all generally be referred to herein as a "circuit," "module," or "system." Furthermore, the present invention may take the form of a computer program product on a computer-usable storage medium having computer-usable program code embodied in the medium.

Any suitable computer-usable or computer-readable storage medium may be utilized. The computer-usable or computer-readable storage medium may be, for example, but is not limited to, an electronic, magnetic, optical, electromagnetic, infrared, or semiconductor system, apparatus, or device. More specific examples (a non-exhaustive list) of the computer-readable storage medium includes: a portable computer diskette, a hard disk, a random access memory (RAM), a read-only memory (ROM), an erasable programmable read-only memory (EPROM) or Flash memory, a portable compact disc read-only memory (CD-ROM), an optical storage device, or a magnetic storage device. It should be noted that the computer-usable or computer-readable storage medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this disclosure, a computer-usable or computer-readable storage medium may be any medium that can contain or store the program for use by or in connection with an instruction execution system, apparatus, or device.

Computer program code for carrying out operations of the present invention may be written in an object oriented programming language, such as Java, Smalltalk, C++, etc. However, the computer program code for carrying out operations of the present invention may also be written in conventional procedural programming languages, such as the "C" programming language or similar programming languages.

The present invention is described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operations to be performed on the computer or other programmable apparatus to produce a computer implemented process such that the instructions which execute on the computer or other programmable apparatus implement the functions/acts specified in the flowchart and/or block diagram block or blocks. As may be used herein, the term "coupled" includes both a direct electrical connection between blocks or components and an indirect electrical connection between blocks or components achieved using one or more intervening blocks or components.

As noted above, traditionally, system designers have focused on optimizing hardware energy consumption, as contrasted with optimizing software to reduce energy consumption. According to various aspects of the present disclosure, a technique for providing environmental impact information associated with code includes determining, based on execution of the code on a computer system, an environmental impact of a code execution sequence included in the code. A section of the code that is associated with the code execution sequence is then annotated with environmental impact information associated with the environmental impact of the code execution sequence.

Managing an environmental impact of a computing resource becomes more desirable as more computing resources are leveraged in the global economy, and as the cost of energy to consumers and to the environment grows. A direct corollary of efficient execution in terms of speed, is efficient execution in terms of environmental impact. A program that achieves the same objective in less time on the same machine generally employs fewer computational cycles, fewer memory accesses, and fewer disk operations to achieve the objective. As such, optimizing code with respect to speed frequently reduces an environmental impact of the software.

However, power usage (i.e., energy consumed per unit time) on a computer fluctuates, in part, because utilization of the computer (e.g., CPU utilization, memory accesses, disk usage, etc.) by the code executing on the computer fluctuates. As such, codes that execute in the least amount of time may, under certain circumstances, consume more energy than codes that execute more slowly. This is especially true if faster code execution requires sharp peaks in computer resource utilization. For example, if a program accesses a single disk in order to load data into memory, the high cost of spinning up that disk is incurred once. If however, to achieve a faster execution time, a code accesses multiple disks in a file system in parallel, a higher overall energy cost may be incurred as multiple disks require powering up.

In addition, the fact that different computers execute code differently, such that a faster computer may consume more energy than a slower computer to execute the same code, makes estimating the environmental impact of code difficult without direct measurement. Moreover, faster code execution may have the added environmental cost of generating higher heat densities in a computer and/or facility in which the code is executed. In this case, higher peak cooling demands may lead to higher indirect power consumption costs. In this case, it is desirable to provide measures of total environmental costs of code execution. Annotation of the code that originates these costs can facilitate a means for executables and shared objects to become self-reporting of expected environmental impact based on the platform on which the executables and shared objects are executed.

According to various aspects of the present disclosure, techniques are disclosed that correlate real-time environmental impact measures with real-time code execution patterns in a piece of software. The software is then annotated with the correlated measures to facilitate self-reporting of expected environmental impact of the software, based on the assumption that the context in which a set of correlated measures was taken can be recognized in the current execution environment. It should be appreciated that any environmental impact associated with execution of code may lag the execution of the code. For example, when execution of code causes a temperature within a facility to increase, power consumption associated with cooling the facility (to counteract the temperature increase) lags the execution of the code. In this case, a system model that correlates code execution with environmental impact may be required.

Advantageously the disclosed techniques (as contrasted with approaches that employ speed of computing as a proxy for estimating power consumption) provide: a direct measure of power consumption and thus environmental impact; the ability to measure multiple points of power consumption (CPU, cooling, etc.) and correlate the measures with the run-time execution sequence; and the ability to compare power consumption patterns between computer platforms.

The techniques disclosed herein also facilitate (as contrasted with systems that measure power consumption directly without correlating power consumption to code execution patterns): transmitting signals from program counters or other system execution measures to power measuring devices to synchronize and correlate the measures; transmitting signals from power measuring devices to a component of a computer to correlate power consumption measures with a run-time sequence; and embedding annotations of the power consumption/environmental impact profiles (in either a human or machine-readable format) of particular code segments, executables, shared objects, and processes into the code. The annotations may then be used to minimize the environmental impact of a piece of software, if desired.

Aspects of the present disclosure may take various implementations and configurations. Code execution may be tracked by, for example: using debugger-like tracking options and employing a symbol table and cross-reference map; tracking a particular executable and/or shared object execution; or tracking multiple processes executing in an operating system. Code measurements of system utilization and environmental impact may be made based on, for example: specific utilization patterns within a computer and components (CPU cores, parallel processors, disk, memory) of the computer; total power consumption of the computer; or secondary power consumption of a total computing facility (including, for example, cooling of the facility). Combining of data about code execution patterns and power consumption may be achieved by, for example: transmitting data about program execution to measuring components (such that environmental impact measures may be annotated or synchronized to program counters); or transmitting environment impact measures either directly through a computer (for example, through a run-time system that monitors CPU utilization/power consumption) or indirectly through a communication network coupling external measurements (e.g., room cooling power consumption meters) with the computer (e.g., through a Bluetooth network).

Profiles may be created for all combinations of hardware systems and operating systems as each hardware system and operating system may have different power usage characteristics for the same code. For machine independent languages (e.g., C, C++, Java) the average performance for the most common combinations may be annotated. Various approaches may be used to gather the execution environment for system profiling. The measurements may be correlated with the code in real-time to allow dynamic optimization of environmental impact during run-time. Alternatively, the measurements may be correlated with the code at some subsequent time in order to create a database or other compilation of correlation data. For example, the code may be annotated by: creation of a database of usage/power consumption correlations, which is then associated with the code; direct annotation of source code with non-compiled, human readable comments; annotating source code with compiled data (such as static variables) containing data about the environmental impact of code execution such that recompiled executables and shared objects may be analyzed to achieve an estimate of their environmental impact; and annotating the binary (executable) code at a location agreed upon by vendors and operating system providers so that the binary code contains environmental information data that is not interpreted as part of the actual execution sequence.

Code self-reporting of environmental impact may be implemented in a number of different manners. For example, code may be compiled with a specific flag option set (similar to the way in which '-g' is set to indicate that debugging is turned on). In this case, the flag allows environmental impact measurement and logging components to access program counters. As another example, code may be written to support an application programming interface (API) that can report when code segments (such as main executable code and/or shared object executable code) are entered. Employing an API allows measurement and logging components to be linked directly into an executable as a shared library with the data being accessed during run-time.

As yet another example, a daemon (background process) may be run on a computer to monitor the way in which executables, processes, and threads are scheduled and executed by an operating system. The monitoring produces data which can then be accessed in file format from measurement and logging components. As still another example, power consumption measurement devices may be embedded in the computer. In this case, the power consumption measurement devices communicate measurements in real-time through the run-time system to a logging component. Such embedded monitoring devices may access individual components of the system (disks, CPUs, memory components, etc.) to provide specific data on the power consumption of the components.

According to a different aspect of the present disclosure, power consumption metering devices may be implemented external to the computing system, ranging from industrial scale meters and electronic components responsible for monitoring whole-facility power consumption to a small-scale "plug through" device that allows monitoring of power consumed by a small computing system (such as through a power strip to which all the components are attached). In this case, the devices may then be communicatively coupled to a logging component through a standard communication network, e.g., the Internet, a local area network (LAN), or a wireless (e.g., Bluetooth) connection.

According to another embodiment, a logging component may be a stand-alone component, integrated into a program counter component, a daemon, or a power consumption measurement device. In this case, the logging component may correlate real-time data from the sources and log the real-time data together in a format that preserves synchronization markers for the two types of measurements (program counts or operating system scheduling of program execution and power consumption measurements).

An analyzing component is responsible for correlating the two measures either in real-time or after a portion of time-based measurements has been accumulated by the logging component. The correlation analysis may then be recorded. Correlation data may be stored in a database residing on an associated computer system or elsewhere. The database is then used by other components to plan code execution in such a way as to adjust the environmental impact of the software at run-time. Correlation data may be entered as human-readable comments into the source code based on the measured position of the program counters when certain power consumption measurements were made.

While human readable, the comments may be primarily intended for reading and analysis by planning components whose aim is to adjust the environmental impact of the software at run-time. Correlation data may be entered into the code in such a way as to be machine readable in the compiled objects themselves, such as by means of entering the data as static variables identifiable, for example, by using the Unix command "Strings" or "grep" applied to the object files.

A sample code sequence that is configured to measure environmental impact information is set forth below:

```
#include "Segment.h"
#include "Branch.h"
#include "SegmentDescriptor.h"
#define MIN_MASS 1.0
extern SegmentDescriptor __SegmentDescriptor;
Segment::Segment( )
       : _branch(0), _mass(0), _segmentIndex(0), _segmentArrayIndex(0)
{
        // BEGIN_ENV_IMPACT_MEASURE
        // BEGIN_POWER_CONSUMPTION
        // BG/L : 0.01 Wh/node
        // BG/P : 0.01 Wh/node
    for (int i=0; i<3; ++i) {
    _velocity[3]=0;
    _force[3]=0;
    }
        // END_POWER_CONSUMPTION
        // END_ENV_IMPACT_MEASURE
}
void Segment::load(FILE* inputDataFile, Branch* branch, const int segmentIndex)
{
        // BEGIN_ENV_IMPACT_MEASURE
    _branch = branch;
    _segmentIndex = segmentIndex;
        // BEGIN_DISK_UTILIZATION
        // 2.0 Wh/GB/ionode
        // 5000 revs/ionode
    fread(_coordinates, sizeof(double), 3, inputDataFile);
    for (int i=0; i<3; ++i) _coordinates[ORIG_COORDS+i]=_coordinates[i];
    double sphere;
    fread(&sphere, sizeof(double), 1, inputDataFile);
    fread(&_coordinates[RADIUS], sizeof(double), 1, inputDataFile);
        // END_DISK_UTILIZATION
        // END_ENV_IMPACT_MEASURE
    //printf("%f %f\n",_coordinates[0],_coordinates[4]);
    _coordinates[KEY]=_SegmentDescriptor.getSegmentKey(this);
    _mass = (_coordinates[RADIUS]+MIN_MASS) * (_coordinates[RADIUS]+MIN_MASS)
 * (_coordinates[RADIUS]+MIN_MASS);
    }
    void Segment::writeCoordinates(FILE* fp)
    {
      fwrite(_coordinates, sizeof(double), 3, fp);
    #ifdef BINARY64BITS
      fseeko64(fp, sizeof(double)*2, SEEK_SET);
    #else
      fseek(fp, sizeof(double)*2, SEEK_SET);
    #endif
    }
            Another sample code sequence that is configured with to measure environmental
impact is set forth below:
    #include "Communicator.h"
    #include "Receiver.h"
    #include "Sender.h"
    Communicator::Communicator( )
        {
        }
    Communicator::~Communicator( )
    {
    }
    void Communicator::allToAll(Sender* s, Receiver* r, int sCycle, int rCycle, int phase)
    {
        // BEGIN_ENV_IMPACT_MEASURE
        // BEGIN_POWER_CONSUMPTION
        // BG/L : 2 Wh/GB/1000 nodes
        // BG/P : 1.25 Wh/GB/1000 nodes
```

```
        MPI_Alltoall(s->getSendbuf(sCycle, phase), *s->getSendcounts(sCycle, phase),
              *s->getSendtypes(sCycle, phase), r->getRecvbuf(rCycle, phase),
                *r->getRecvcounts(rCycle, phase), *r->getRecvtypes(rCycle, phase),
              MPI_COMM_WORLD);
        // END_POWER_CONSUMPTION
        // END_ENV_IMPACT_MEASURE
    }
    void Communicator::allToAllV(Sender* s, Receiver* r, int sCycle, int rCycle, int phase)
    {
        // BEGIN_ENV_IMPACT_MEASURE
        // BEGIN_POWER_CONSUMPTION
        // BG/L : 2.1 Wh/GB/1000 nodes
        // BG/P : 1.26 Wh/GB/1000 nodes
        MPI_Alltoallv(s->getSendbuf(sCycle, phase), s->getSendcounts(sCycle, phase),
              s->getSdispls(sCycle, phase), *s->getSendtypes(sCycle, phase),
              r->getRecvbuf(rCycle, phase), r->getRecvcounts(rCycle, phase),
                r->getRdispls(rCycle, phase), *r->getRecvtypes(rCycle, phase),
              MPI_COMM_WORLD);
        // END_POWER_CONSUMPTION
        // END_ENV_IMPACT_MEASURE
    }
    void Communicator::allToAllW(Sender* s, Receiver* r, int sCycle, int rCycle, int phase)
    {
        // BEGIN_ENV_IMPACT_MEASURE
        // BEGIN_POWER_CONSUMPTION
        // BG/L : 3 Wh/GB/1000 nodes
        // BG/P : 2.25 Wh/GB/1000 nodes
        MPI_Alltoallw(s->getSendbuf(sCycle, phase), s->getSendcounts(sCycle, phase),
              s->getSdispls(sCycle, phase), s->getSendtypes(sCycle, phase),
              r->getRecvbuf(rCycle, phase), r->getRecvcounts(rCycle, phase),
                r->getRdispls(rCycle, phase), r->getRecvtypes(rCycle, phase),
              MPI_COMM_WORLD);
        // END_POWER_CONSUMPTION
        // END_ENV_IMPACT_MEASURE
    }
    void Communicator::allGather(Sender* s, Receiver* r, int sCycle, int rCycle, int phase)
    {
        // BEGIN_ENV_IMPACT_MEASURE
        // BEGIN_POWER_CONSUMPTION
        // BG/L : 0.75 Wh/GB/1000 nodes
        // BG/P : 0.5 Wh/GB/1000 nodes
        MPI_Allgather(s->getSendbuf(sCycle, phase), *s->getSendcounts(sCycle, phase),
              *s->getSendtypes(sCycle, phase), r->getRecvbuf(rCycle, phase),
              *r->getRecvcounts(rCycle, phase), *r->getRecvtypes(rCycle, phase),
              MPI_COMM_WORLD);
        // END_POWER_CONSUMPTION
        // END_ENV_IMPACT_MEASURE
    }
    void Communicator::allGatherV(Sender* s, Receiver* r, int sCycle, int rCycle, int phase)
    {
        // BEGIN_ENV_IMPACT_MEASURE
        // BEGIN_POWER_CONSUMPTION
        // BG/L : 1.6 Wh/GB/1000 nodes
        // BG/P : 1.1 Wh/GB/1000 nodes
        MPI_Allgatherv(s->getSendbuf(sCycle, phase), *s->getSendcounts(sCycle, phase),
              *s->getSendtypes(sCycle, phase), r->getRecvbuf(rCycle, phase),
              r->getRecvcounts(rCycle, phase), r->getRdispls(rCycle, phase),
              *r->getRecvtypes(rCycle, phase), MPI_COMM_WORLD);
        // END_POWER_CONSUMPTION
        // END_ENV_IMPACT_MEASURE
    }
    void Communicator::allReduceSum(Sender* s, Receiver* r, int sCycle, int rCycle, int phase)
    {
        // BEGIN_ENV_IMPACT_MEASURE
        // BEGIN_POWER_CONSUMPTION
        // BG/L : 2 Wh/GB/1000 nodes
        // BG/P : 1.25 Wh/GB/1000 nodes
        MPI_Allreduce(s->getSendbuf(sCycle, phase), r->getRecvbuf(rCycle, phase),
              *s->getSendcounts(sCycle, phase), *s->getSendtypes(sCycle, phase),
              MPI_SUM, MPI_COMM_WORLD);
        // END_POWER_CONSUMPTION
        // END_ENV_IMPACT_MEASURE
    }
```

With reference to FIG. 1, an example computer system 100 that may be configured to execute code that is configured to measure environmental impact, according to various embodiments of the present disclosure, is illustrated. The computer system 100 includes a processor 102 that is coupled to a memory subsystem 104, a display 106, an input device 108, and mass storage device(s) 110. The memory subsystem 104 includes an application appropriate amount of volatile memory (e.g., dynamic random access memory (DRAM)) and non-volatile memory (e.g., read-only memory (ROM)). The display 106 may be, for example, a cathode ray tube (CRT) or a liquid crystal display (LCD). The input device 108 may include, for example, a mouse and a keyboard. The mass storage device(s) 110 (which may include, for example, a compact disc read-only memory (CD-ROM) drive and/or a hard disk drive (HDD)) are configured to receive or include discs that store appropriate code (e.g., an operating system (OS), and various applications, etc.).

Figure 2:
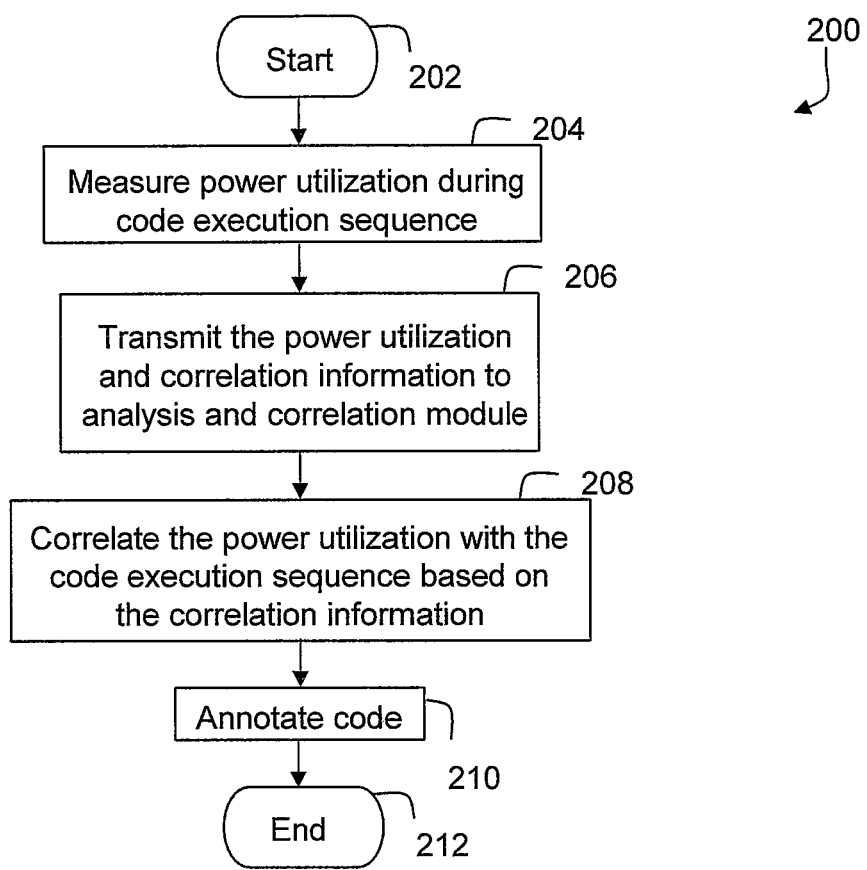
FIG. 2 is a flowchart of an example process for providing environmental impact information associated with code, according to one embodiment of the present disclosure.

With reference to FIG. 2, a process 200 for providing environmental impact information associated with code includes determining, based on execution of the code on a computer system, an environmental impact of a code execution sequence included in the code. The process 200 is initiated at block 202, at which point control transfers to block 204. The determining, based on execution of the code on a computer system, an environmental impact of a code execution sequence may include: measuring power utilization of the computer system during execution of the code execution sequence (block 204); transmitting the power utilization and correlation information to an analysis and correlation module (block 206); and correlating the power utilization with the code execution sequence based on the correlation information (block 208). For example, reverse correlation may be employed to correlate environmental impact measures with preceding code execution sequences.

In one embodiment, the environmental impact information includes at least one of power utilization, central processing unit utilization, memory accesses, and disk drive utilization associated with the computer system. The correlation information may correspond to, for example, a program counter value. The annotations may be in a human readable format or a machine readable format. The code may be, for example, source code or binary code. The source code may be compiled with an environmental flag set to provide the code with environmental impact information. In this case, the environmental flag causes a compiler to compile the source code in a manner which allows environmental impact measurement and logging components to access a program counter. The environmental impact may, for example, correspond to power utilization measurements provided by one or more power measurement devices embedded within the computer system.

The code may be written to support an application programming interface (API) that is configured to report when code segments are entered. In this case, the API links measurement and logging components to the code and facilitates data sharing during run-time. Execution of the code execution sequence may be deferred to a later time based on the environmental impact of the code execution sequence. The code execution sequence may correspond to a subset of the code or the code as a whole. Environmental impact may be measured using respective power meters that measure power consumption for associated components of the computer system during execution of the code execution sequence.

Alternatively, environmental impact may be measured using a power meter that measures power consumption for a facility associated with the computer system based on execution of the code execution sequence. Next, in block 210, a section of the code that is associated with the code execution sequence is annotated with environmental impact information associated with the environmental impact of the code execution sequence. Following block 210, control transfers to block 212 where the process 200 terminates and control returns to a calling routine.

Figure 3:
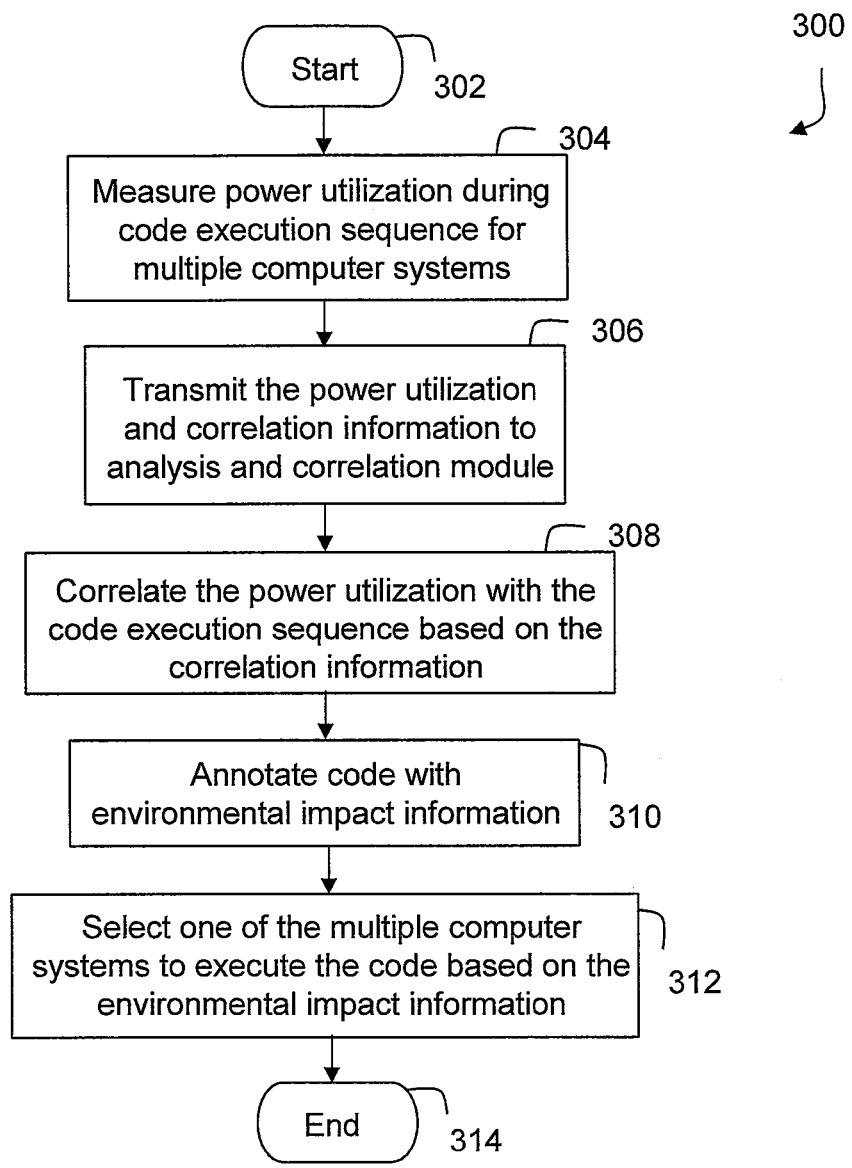
FIG. 3 is a flowchart of an example process for providing environmental impact information associated with code, according to another embodiment of the present disclosure.

With reference to FIG. 3, an example process 300 for providing environmental impact information associated with a code execution sequence of code is illustrated. The process 300 is initiated at block 302, at which point control transfers to block 304. In block 304, power utilization of multiple computer systems is measured during execution of the code execution sequence. The measured power may correspond to: the power for at least some of the individual components of the multiple computer systems, the power for the multiple computer systems, or power for facilities associated with the multiple computer systems. Next, in block 306, the power utilization and correlation information is transmitted to an analysis and correlation module (e.g., included in an environmental impact application).

Then, in block 308, the power utilization is correlated with the code execution sequence based on the correlation information. Next, in block 310, the code is annotated with the environmental impact information. Then, in block 312, one of the multiple computer systems is selected to execute the code based on the environmental impact information. For example, one of the multiple computer systems may be selected to execute the code following loading of stored code (that includes annotated environmental information) and reading of the annotated environmental information. Following block 312, control transfers to block 314 where the process 300 terminates and control returns to a calling routine.

Accordingly, a number of techniques have been disclosed herein that facilitate providing environmental impact information associated with code. The environmental impact information may be advantageously employed to determine which of multiple computer systems to execute the code on to reduce power consumption associated with the code or to defer execution of the code until a later time when facility power requirements are reduced.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to preferred embodiments thereof, it will be apparent that modifications and variations are possible without departing from the scope of the invention defined in the appended claims.

What is claimed is:

1. A method for providing environmental impact information associated with code executed by hardware of a computer system, the method comprising:
    a hardware processor obtaining a measurement of an environmental impact of execution of a sequence of the code, wherein the measurement is obtained based on execution of the sequence of the code on the computer system, the sequence of the code being included in a binary executable file;
    the hardware processor annotating a section of the code with environmental impact information, the section of the code being associated with the sequence of the code, wherein the annotating comprises embedding the environmental impact information into the section of the code in a portion of the binary executable file or a source file from which the binary executable file is compiled, wherein the embedded environmental impact information with which the section of the code is annotated comprises the obtained measurement of the environmental impact of execution of the sequence of the code, and wherein the environmental impact information with which the section of the code is annotated is indicative of the environmental impact of executing the sequence of the code on the computer system; and
    based on the annotating, dynamically selecting during run-time, from a plurality of computer systems available for executing the sequence of the code, one computer system to execute the sequence of the code.

2. The method of claim 1, wherein the environmental impact information with which the section of the code is annotated includes at least one measure of power utilization, central processing unit utilization, memory accesses, and disk drive utilization associated with the computer system.

3. The method of claim 1, wherein the hardware processor correlates the obtained measurement of environmental impact with the sequence of the code based on correlation information transmitted by a measurement device, and wherein the correlation information corresponds to a program counter value.

4. The method of claim 1, wherein the annotating comprises annotating the section of the code with annotations in a human readable format.

5. The method of claim 1, wherein the annotating comprises annotating the section of the code with annotations in a machine readable format, and wherein the dynamically selecting facilitates reducing an environmental impact of execution of the sequence of the code.

6. The method of claim 1, wherein the code is source code.

7. The method of claim 1, wherein the code is binary code.

8. The method of claim 1, further comprising compiling source code with an environmental flag set, wherein the set environmental flag causes compiling of the source code in a manner which allows environmental impact measurement and logging components to access a program counter.

9. The method of claim 1, wherein the environmental impact corresponds to at least one power utilization measurement provided by at least one power measurement device.

10. The method of claim 1, wherein the code is written to support an application programming interface that is configured to report when code segments are entered, wherein the application programming interface links measurement and logging components to the code and facilitates data sharing during run-time.

11. The method of claim 1, further comprising:
    another hardware processor loading code that includes annotated section of code;
    the another hardware processor reading the environmental impact information from the annotated section of the code; and
    the another hardware processor selecting, from multiple available computer systems, one of the multiple available computer systems to execute the loaded code based on the read environmental impact information.

12. The method of claim 1, further comprising:
    another hardware processor loading code that includes the annotated section of the code;
    the another hardware processor reading the environmental impact information from the annotated section of the code; and
    the another hardware processor deferring execution of the loaded code to a later time based on the read environmental impact information.

13. The method of claim 1, wherein the sequence of the code is a subset of the code or is the code as a whole.

14. The method of claim 1, wherein the obtaining the measurement of the environmental impact of the execution of the sequence of the code on the computer system comprises measuring power consumption of at least one associated component of the computer system that is attributable to the execution of the sequence of the code.

15. The method of claim 1, wherein the obtaining the measurement of the environmental impact of the execution of the sequence of the code on the computer system comprises measuring power consumption of a facility associated with the computer system that is attributable to execution of the sequence of the code.

16. A system for providing environmental impact information associated with code, the system comprising:
    a hardware processor;
    a computer readable tangible storage device; and
    program instructions stored on the computer readable tangible storage device for execution by the hardware processor, the program instructions comprising:

program instructions to obtain a measurement of an environmental impact of execution of a sequence of the code, wherein the measurement is obtained based on execution of the sequence of the code on a computer system, the sequence of the code being included in a binary executable file;

program instructions to annotate a section of the code with environmental impact information, the section of the code being associated with the sequence of the code, wherein the annotating comprises embedding the environmental impact information into the section of the code in a portion of the binary executable file or a source file from which the binary executable file is compiled, wherein the embedded environmental impact information with which the section of the code is annotated comprises the obtained measurement of the environmental impact of execution of the sequence of the code, and wherein the environmental impact information with which the section of the code is annotated is indicative of the environmental impact of executing the sequence of the code on the computer system; and program instructions to, based on the annotating, dynamically select during run-time, from a plurality of computer systems available for executing the sequence of the code, one computer system to execute the sequence of the code.

17. The system of claim 16, wherein the program instructions to annotate comprise program instructions to annotate the section of the code with annotations in a machine readable format, the annotations in a machine readable format facilitating a run-time selection, based on an analysis of the annotations, of a system to execute the sequence of the code to facilitate reducing an environmental impact of execution of the sequence of the code.

18. A computer program product for providing environmental impact information associated with code, the computer program product comprising:

a computer readable hardware storage device comprising program instructions for execution by a hardware processor, the program instructions comprising:

program instructions to obtain a measurement of an environmental impact of execution of a sequence of the code, wherein the measurement is obtained based on execution of the sequence of the code on a computer system, the sequence of the code being included in a binary executable file; and program instructions to annotate a section of the code with environmental impact information, the section of the code being associated with the sequence of the code, wherein the annotating comprises embedding the environmental impact information into the section of the code in a portion of the binary executable file or a source file from which the binary executable file is compiled, wherein the embedded environmental impact information with which the section of the code is annotated comprises the obtained measurement of the environmental impact of execution of the sequence of the code, and wherein the environmental impact information with which the section of the code is annotated is indicative of the environmental impact of executing the sequence of the code on the computer system; and program instructions to, based on the annotating, dynamically select during run-time, from a plurality of computer systems available for executing the sequence of the code, one computer system to execute the sequence of the code.

19. The computer program product of claim 18, wherein the program instructions to annotate comprise program instructions to annotate the section of the code with annotations in a machine readable format, the annotations in a machine readable format facilitating a run-time selection, based on an analysis of the annotations, of a system to execute the sequence of the code to facilitate reducing an environmental impact of execution of the sequence of the code.

* * * * *